(12) United States Patent
Breil et al.

(10) Patent No.: US 6,372,174 B1
(45) Date of Patent: Apr. 16, 2002

(54) METHOD AND DEVICE FOR HEATING FOILS AND ARRANGEMENT FOR MEASURING FOIL TEMPERATURES

(75) Inventors: Jürgen Breil, Grabenstätt; Torsten Tomaschko, Teisendorf; Johannes Sänze, Bergen, all of (DE)

(73) Assignee: Brückner Maschinenbau GmbH, Siegsdorf (DE)

( * ) Notice: Subject to any disclaimer, the term of this patent is extended or adjusted under 35 U.S.C. 154(b) by 0 days.

(21) Appl. No.: 09/319,734

(22) PCT Filed: Nov. 20, 1997

(86) PCT No.: PCT/EP97/06499

§ 371 Date: Jul. 8, 1999

§ 102(e) Date: Jul. 8, 1999

(87) PCT Pub. No.: WO98/25753

PCT Pub. Date: Jun. 18, 1998

(30) Foreign Application Priority Data

Dec. 11, 1996 (DE) .......................... 196 51 515

(51) Int. Cl.[7] .................. B29C 35/10; B29C 55/16; D06C 3/00; F27B 9/06; G01B 11/00

(52) U.S. Cl. ................. 264/408; 26/71; 26/72; 26/74; 26/106; 219/388; 264/40.6; 264/288.4; 264/290.2; 264/410; 264/481; 425/143; 425/174.4

(58) Field of Search .................. 264/40.6, 288.4, 264/290.2, 408, 410, 481; 425/143, 174.4; 26/71, 72, 74, 106; 219/388

(56) References Cited

U.S. PATENT DOCUMENTS

| | | |
|---|---|---|
| 3,619,159 A | 11/1971 | Shirley |
| 4,104,769 A | 8/1978 | Levy et al. |
| 4,293,508 A | 10/1981 | Heirbaut et al. |
| 4,457,254 A | 7/1984 | Hungerford |
| 4,634,840 A | 1/1987 | Yamagishi et al. |
| 5,429,785 A | 7/1995 | Jolliffe |
| 5,575,968 A | 11/1996 | Seo et al. |
| 5,660,787 A * | 8/1997 | Van Erden et al. ......... 264/476 |
| 5,753,172 A * | 5/1998 | Forrest, Jr. et al. ......... 264/481 |

FOREIGN PATENT DOCUMENTS

| | | |
|---|---|---|
| DE | 23 56 743 A1 | 5/1975 |
| DE | 35 29 586 A1 | 2/1987 |

OTHER PUBLICATIONS

Patent abstracts of Japan, vol. 012, No. 257 (M–719), Jul. 20, 1988 & JP 63 041126 A (Toray Ind Inc), Feb. 22, 1988.

* cited by examiner

Primary Examiner—Leo B. Tentoni
(74) Attorney, Agent, or Firm—Nixon & Vanderhye

(57) ABSTRACT

The invention concerns an improved method of heating or tempering foils and an associated device including an arrangement for measuring the temperature, based on the following features: a separate arrangement is provided for heating the foil edges; the foil edge heating arrangement comprises an infrared radiator device (21) and a hot air heating device (29); and the infrared radiator device (21) and the hot air heating device (29) can be controlled or set at different heating output values.

21 Claims, 6 Drawing Sheets

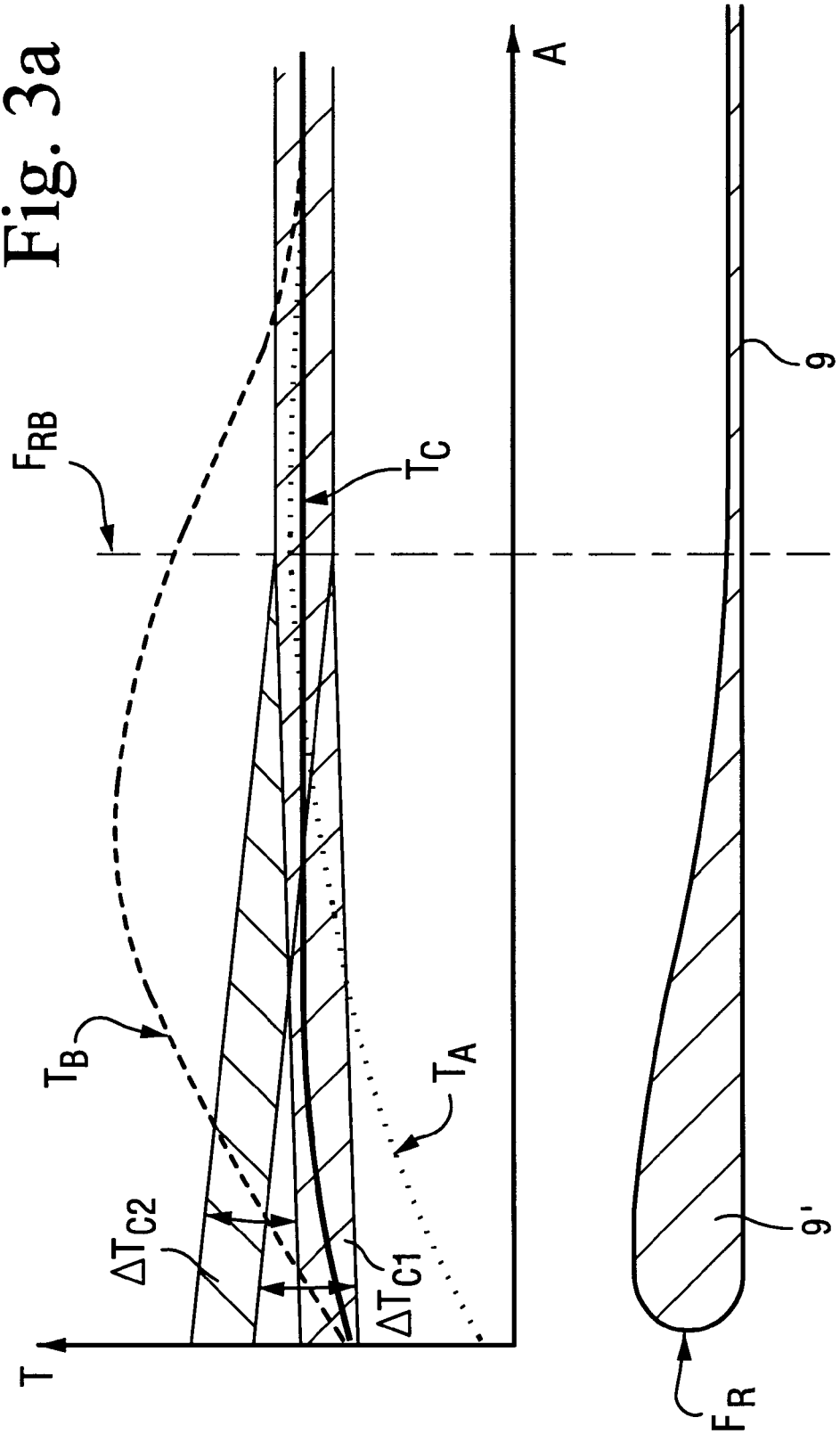

$T_F = f(S_F)$    $S_F = \dfrac{S_{F+C} - (1-a/b) S_C}{a/b}$

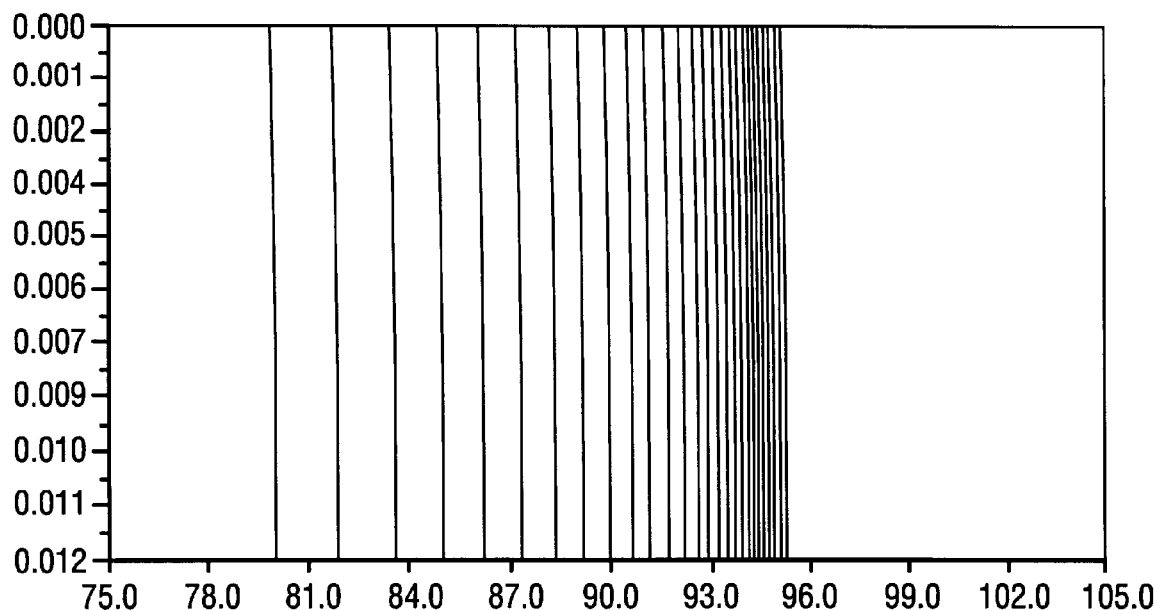
Fig. 6.1
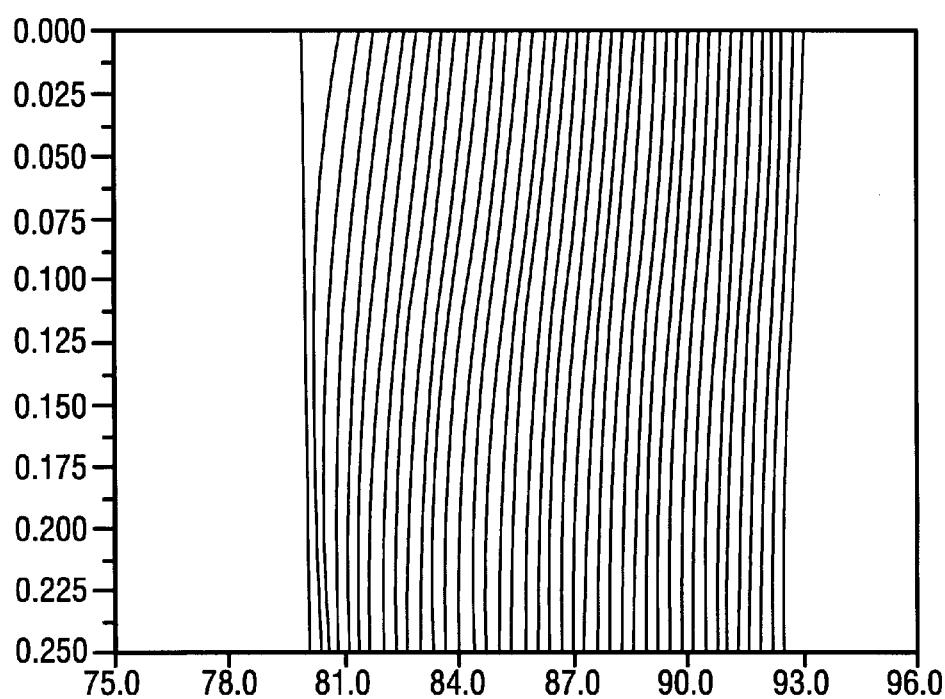
Fig. 6.2

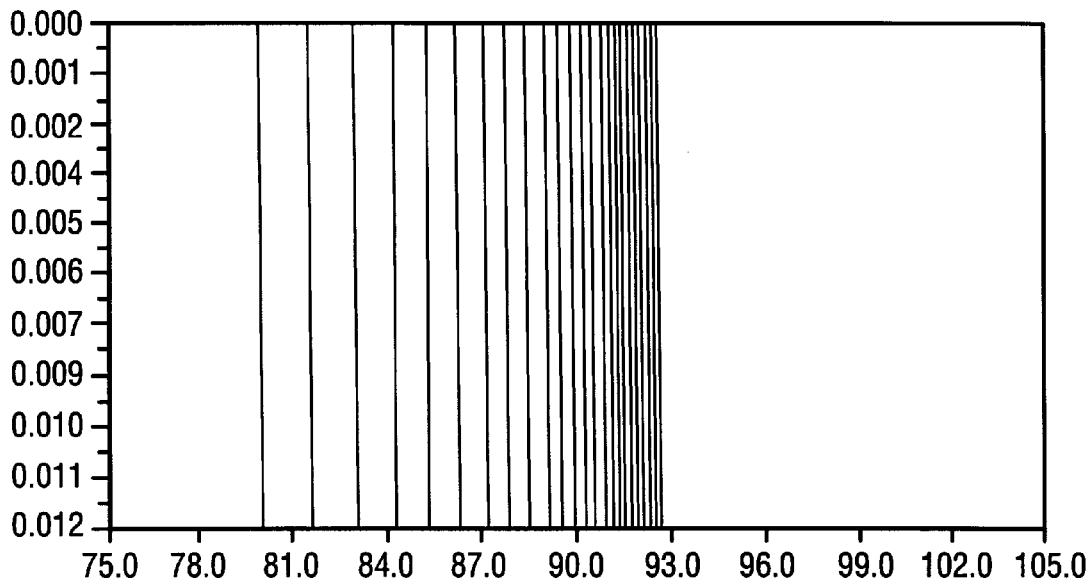
Fig. 6.3
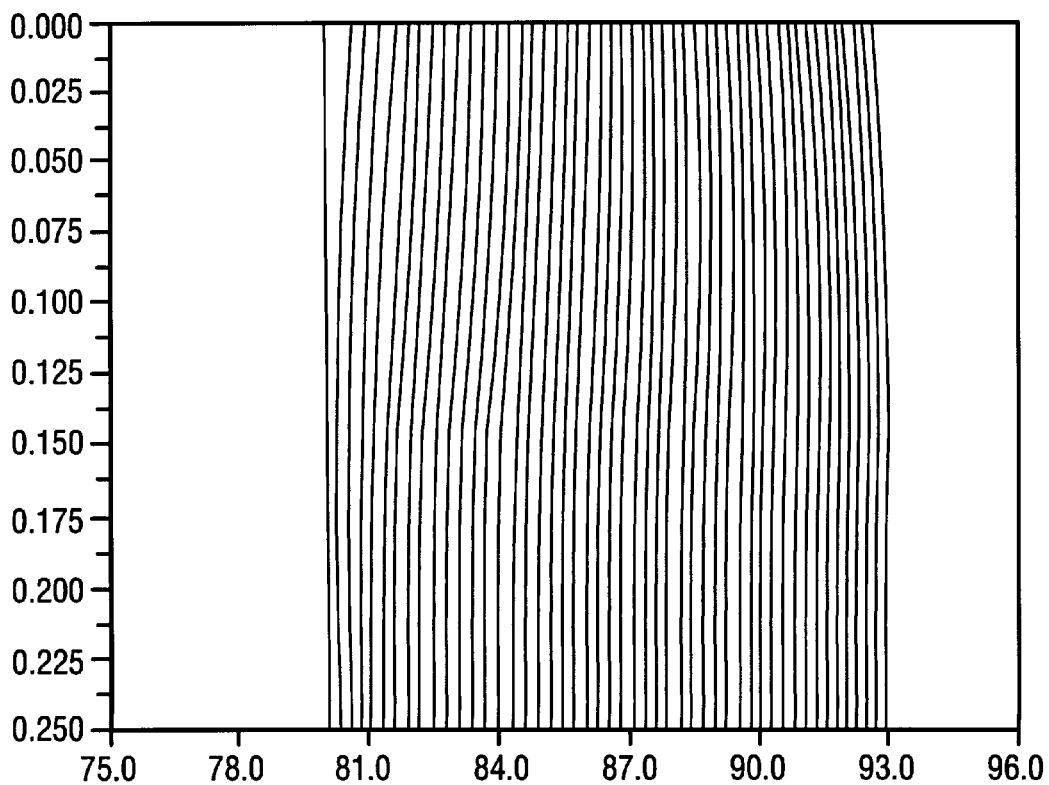
Fig. 6.4

METHOD AND DEVICE FOR HEATING FOILS AND ARRANGEMENT FOR MEASURING FOIL TEMPERATURES

BACKGROUND OF THE INVENTION

The invention relates to a method and an apparatus for film heating and to an associated measuring device for measuring the film temperature. The invention thus refers to thermoplastic films which are preferably produced, for example, on the basis of polyester, polypropylene or polyamide, the preferred materials, namely polyester, polypropylene or, for example, polyamide, not having to be in pure form, but the films also being capable of being produced, using modifications of these materials and/or, moreover, using further admixtures and/or additives.

Devices for the heating and thermal control of films, particularly also in the case of simultaneous stretching processes, are known.

Thus, for example, U.S. Pat. No. 5,429,785 describes a simultaneous stretching plant having a plurality of preheating and intermediate heating devices. These heating devices consist of hot-air heating devices or of infrared radiators. However, a combination of both may also be used for the heating and thermal control of the film. In the method, known from the abovementioned U.S. patent specification, for the production of ultrathin films with a final thickness of less than 2.5 $\mu$m, the abovementioned heating devices can be provided at a plurality of locations in the stretching operation: they are in each case arranged transversely to the drawoff direction of the film web so as to cover the entire film width.

U.S. Pat. No. 5,071,601 discloses a method of producing a thermoplastic film. Here, the film is guided via a plurality of rollers slightly tapering conically, in order, via these, ultimately to produce a curved final film which is used, for example, as an intermediate film for multilayered glazing for motor vehicles. The heating device required for the process of producing the plastic film consists of a plurality of heating zones of an infrared heating device which are arranged, offset relative to one another, transversely to the drawoff path of the plastic film, the heating zones generating increasingly higher temperatures from one edge region of the film to the opposite edge region. This is necessary in order to achieve the desired curved film web profile mentioned. In this case, however, due to the different material stretching, the thickness of the film web has different values, although this is of only minor importance in the specific use and specific service of the plastic film web for the production of motor vehicle glazing.

It was then shown, however, that, in the simultaneous stretching of plastic films, although relatively uniform stretching is possible in the middle region of the film web, problems still arise, above all, in the film edge region. This is because, on the one hand, the film edge region always has a greater material thickness than the remaining middle film web portion. However, the stretching conditions are also impaired due to the fact that poorer heat transmission can be detected at the edge of the film web, this also being caused, inter alia, by the tenterhooks engaging on the film edge.

The object of the present invention is, therefore, to provide a method, as well as an apparatus for carrying out the method, and a suitable film temperature measuring device, which makes it possible to produce plastic film webs of improved quality in a stretching process.

Applicants have found that, in the stretching of films in longitudinal, transverse or simultaneous stretching processes, edges which are thicker, as compared with the middle of the film, must be thermally controlled separately before and during the stretching process, since, because of the greater thickness and the poorer heat transmission at the edge, the desired temperature cannot be achieved solely by blowing with standard nozzles. Another reason for the necessary different thermal control of the film edge and of the middle region of the film web is that the stretching behavior is different in each case. Thus, specifically, the film edge gripped by the tenterhooks is stretched essentially longitudinally, whereas the remaining film web material is stretched biaxially.

Furthermore, particularly in the case of simultaneous stretching, the film edge performs the essential function of the introduction and distribution of force. Since the rigidity of the edge can be influenced within wide ranges by means of the temperature, a defined setting and control of the edge strip temperature assumes appreciable importance.

In the previous stretching plants in general and the simultaneous stretching plants in particular, the film edge has not been thermally controlled separately. Moreover, hitherto, there have also been no solutions for subjecting this edge to special heating in a controlled manner. At the same time, the partitioning off of the film edge by the transport system, that is, above all, the tenterhooks engaging on the film edge at discrete intervals, presents a particular problem, since directional heating of the film edge is thereby impaired even further.

Admittedly, WO 94/047 WO has disclosed an apparatus using injector nozzles to blow textile cloth webs transported on, spread out, said apparatus comprising a blowing or nozzle box facing the top side and the underside of the cloth web. This textile drier is arranged transversely to the cross web. If special edge drying is desired, nozzles may also be directed only onto the edge regions of the cloth web or be subjected only there to treatment gas. To that extent, however, this is a nongeneric prior art, since the subject of the present application relates to an apparatus for the thermal control of plastic film webs during simultaneous stretching processes, and, in this case, specific temperature distributions must be achieved in the plastic material cross section.

Furthermore, DE 25 42 507 A1 has disclosed an apparatus for the zonal regulation of the thickness of a stretchable thermoplastic film web. In this known apparatus, separate film edge heating is not provided, but it is merely proposed to arrange above and, if appropriate, also below the film web parallelepipedic air wells which each have an inlet and an outlet for the hot air capable of being supplied, the throughflow quantity of the hot air supplied being variable in the individual wells by means of blind-like individually moveable slats. This known apparatus does not allow any actual separate film edge heating, however, since hot air having one temperature level can be made available only uniformly for the thermal treatment of the entire plastic film web. The temperature cannot be regulated zonally, only the hot air quantity. Moreover, heating is to take place solely by means of hot air, without the recognition that optimal film edge heating, and therefore temperature regulation for the film edge, can be achieved precisely by combined heat treatment by means of hot air and infrared irradiation.

BRIEF DESCRIPTION OF THE INVENTION

The present invention affords numerous advantages. By virtue of the inventive edge strip heating for simultaneous stretching plants, the quality of the plastic film webs to be produced is markedly improved, as compared with conventional films produced. The material edges of a plastic film web, which are thicker as a consequence of production, can now be thermally controlled and heated directionally, in such a way that, in a simultaneous stretching process, this edge region of a plastic film web can also be optimally stretched. In order to achieve, overall, an optimal stretching condition for the film in terms of the running stability of the latter, on the one hand, and of the introduction of force from the film edge to the film web to be stretched, on the other hand, it is necessary for the film edge and the rest of the film material to be heated to the same temperature, despite the different thickness. By means of the inventively combined separate thermal control operation for the film edge by means of hot air and infrared radiation, almost any desired temperature profile can be set, and implemented, over the width of the film edge.

The use of infrared radiation for the heating and thermal control of the film edge is particularly suitable. This is because the film material can absorb the energy or output of the infrared irradiation over a substantially shorter distance, and therefore within a substantially shorter time, than hot air on account of the higher heat transmission. Particularly because short-wave rays (1.1. µm) are used, the radiation penetrates more deeply into the film edge material. At the same time, a high output can be generated in a small space and be introduced into the film. Preferably concentrated radiation results not only in a high output, but also in heating over an exact area. In this case, however, the surface of the film could be damaged by an excessive introduction of heat, at the same time the underside of the film possibly still being below the temperature ranges to be achieved per se. The solution therefore lies in the simultaneous concentrated action of air at high velocity on the film edge. The hot air is set to a specific desired temperature, in such a way that the process is controlled via this so that rapid heating, which is uniform over the film thickness, is achieved (equalization of the heat introduced as a result of the infrared radiation). Particularly for special edge geometries with a thickness profile decreasing toward the middle of the film, the additional air is helpful and is important in order to prevent the thinner regions of the edge profile from being overheated by the infrared radiator and destroyed.

The factor essential for the introduction of energy is due to the infrared radiator. At the same time, the fact that the thicker film edge has a higher absorption behavior, as compared with the thinner film material portion adjoining it, has a positive effect. The absorption behavior is therefore dependent on the film thickness. This can be utilized particularly effectively in so-called bright radiators (radiator temperature above 2000° C.). This means, for the heating operation, that the thinner film material transmits more radiation than the comparatively thicker film edge, so that the thinner film material portions adjacent to the edge therefore cannot be overheated, which would lead to tears during stretching.

However, a slightly higher temperature of the film cannot be avoided when the adjustable lateral blowing nozzles, preferably provided specially for film edge heating, are operated at the so-called process temperature. Thus, whereas, for example, the plastic film (with the exception of its edge regions) can be subjected overall to hot air in the corresponding heating zones at a temperature of, for example, 93° C. (=process temperature), a process temperature set slightly lower for the hot air is preferably used in the edge region. However, due to the combination with the infrared radiator, a reduction in the air temperature for the lateral blowing nozzles to, for example, 90° C. then makes it possible for the temperature between the edge and the remaining film material to be set very accurately to an almost constant desired temperature level.

The inventive advantages of almost entirely constant thermal control of a film over the entire width are afforded in a combination of infrared radiation and convection (blowing with hot air), even when this combined thermal control operation is carried out from only one side (for example, the top side of the film). Even here, the temperature profile is actually set equally constantly and uniformly over the entire film thickness. In this case, maximum temperature deviations of, for example, 2° K. or 1° K. over the entire film edge thickness are possible.

A measuring device according to the invention for the appropriate setting of the desired temperature profile even in the film edge region is distinguished by the use of a pyrometer, the setting time of which is such that the interchange between tenterhooks moving past and film does not lead to a signal fluctuation. If, furthermore, measurement, determination or presetting of the temperature of the tenterhook is taken into account, the edge strip temperature can ultimately be ascertained comparatively accurately from these data and may then serve again as an initial control variable for activating the heating device.

BRIEF DESCRIPTION OF THE DRAWINGS

The invention is explained below by means of exemplary embodiments with reference to several drawings in which in particular:

FIG. 3*a*: shows a graph to make clear the temperature profile in the film edge;

FIG. 3*b*: shows a diagrammatic cross section through a plastic film in the edge region;

FIGS. 6.1 to 6.4 show various temperature profiles in the film, and in the film edge.

DETAILED DESCRIPTION OF THE INVENTION

Figure 1:
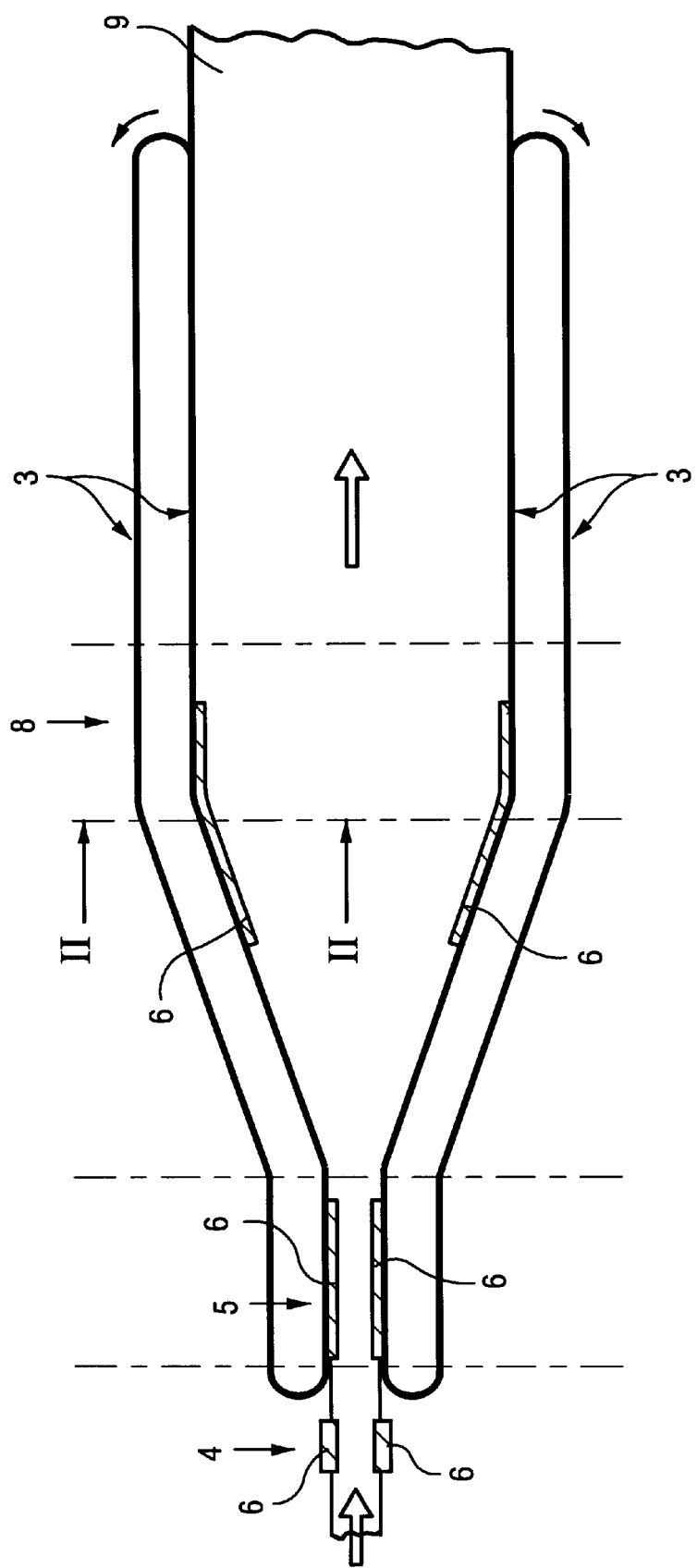
FIG. 1: shows a diagrammatic top view of a simultaneous stretching plant.
Figure 2:
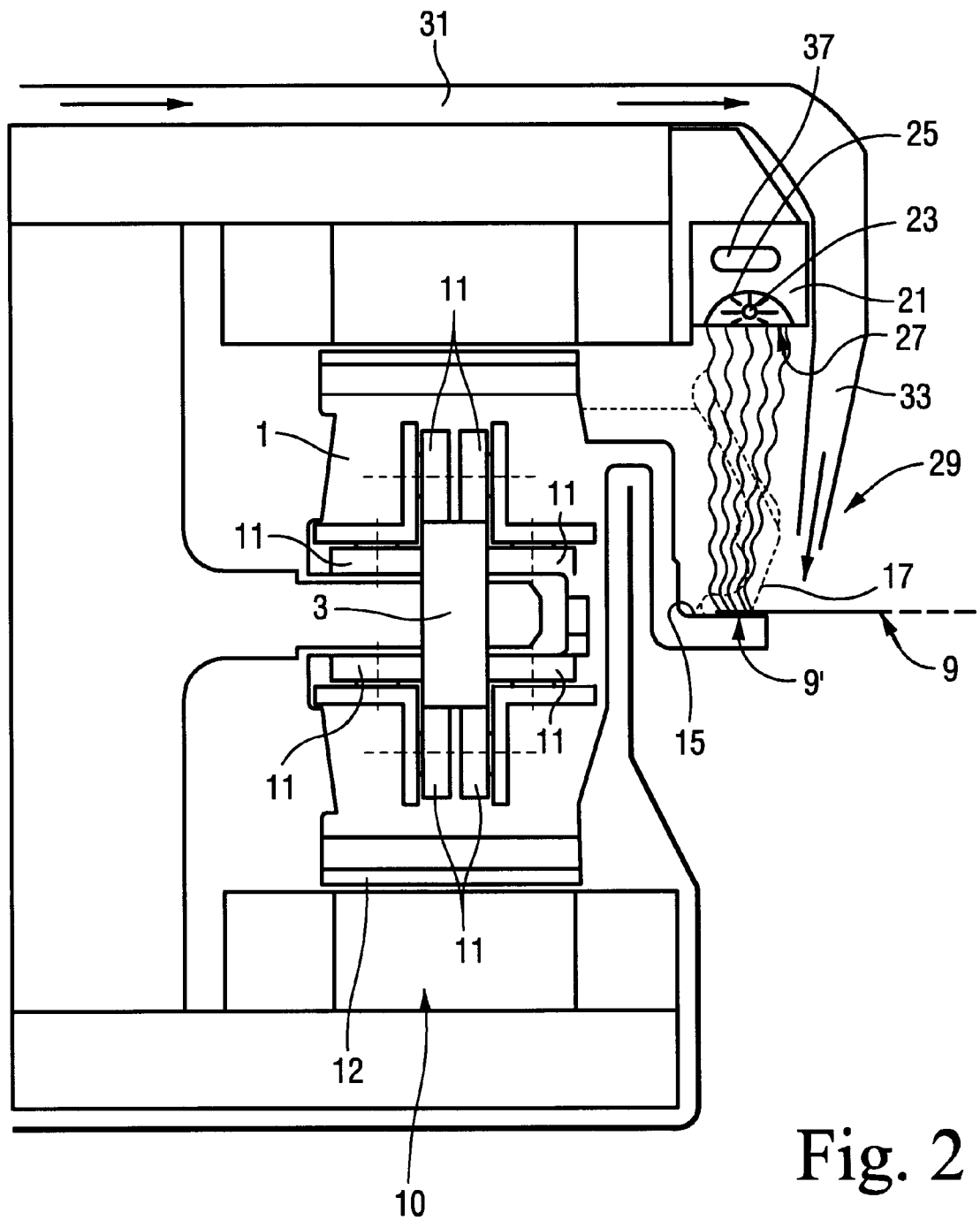
FIG. 2: shows a diagrammatic cross-sectional illustration through a tentered web at a location adjacent to a film edge.

The diagrammatic top view according to FIG. 1 shows a simultaneous stretching plant for producing plastic film webs, in which, as is known, a plastic web of comparatively small width, coming from an extruder not illustrated in any more detail, is gripped at its two edges by means of so-called tenterhooks, via an intermediate cooling drum arrangement likewise not illustrated, in the entry region of the simultaneous stretching plant. In this case, the tenterhooks, or tenterhook carriage 1, shown in FIG. 2 are moved on the two laterally rotating tracks 3, for example by means of a linear motor drive. At the same time, the plastic web 9 is appropriately thermally controlled or heated, for example in a so-called infeed zone 4, a subsequent preheating zone 5, with the plastic film web width still remaining the same, and a subsequent simultaneous stretching zone 7 as well as a further subsequent restretching zone 8, corresponding film edge heating devices being represented in FIG. 1 by the reference symbol 6. Furthermore, the so-called thermally controlled zone may also be followed by another restretching zone and a so-called relaxation and/or cooling zone, in which zones the plastic film width can be kept essentially constant or be set slightly narrower, as compared with the maximum plastic film web width at the end of the simultaneous stretching zone 7. At the end of the stretching plant illustrated in FIG. 1, the plastic film web 9 is then released by the opening of the tenterhooks and is conveyed further via various draw rollers.

FIG. 2 shows, for example, a diagrammatic cross section along the line II—II in FIG. 1, which illustrates diagrammatically that tenterhooks, or tenterhook carriages 1, are driven, for example via a linear motor drive, on a rotary track 3 of rectangular cross section, the tenterhook carriages being capable of running, and being held, via a multiplicity of running rollers 11 on the opposite horizontal and vertical running surfaces 13 on the rails 3. The magnet coils 10 for the linear motor drive may, for example, be arranged in each case at a fixed location along the rail track 3, plates with permanent magnets 12 being designed on the tenterhooks, and being separated from said rail track by a small clearance.

The film edge 9' of the plastic film web 9 is clamped on the tenterhook table 15 in a known way, specifically by means of a pivotably held tenterhook lever 17 which is brought into the closing position and which is illustrated merely by dashed and dotted lines in FIG. 2.

In the exemplary embodiment shown, infrared radiators 21 are accommodated above the film edge 9' in the cross-sectional illustration and, at the same time, also above the upper end of the pivotable tenterhook levers 17 themselves, in each case in the heating zones of the plastic film web. Here, the radiator source 23 is equipped on the side facing away from the film, that is to say overhead in the exemplary embodiment shown, with a reflector 25 which is of concave design, that is to say is shaped with a preferably parabola-like cross section, as a result of which concentration and focusing of the infrared rays in the direction of the film edge 9' can be achieved.

To protect the reflector surface and the radiator source itself, the underside of the infrared radiator 21 thus formed may also be covered with a protective plate, for example a glass plate 27. For better focusing, lenses 27 or diaphragms may also be used. Moreover, mirror reflectors may be arranged on the underside of the film edge.

Furthermore, a hot-air heating or thermal control device is also provided for heating the film edge 9'. This device comprises a hot-air supply duct 31 which is laid above the respective rail 3 and merges into a vertical hot-air duct 33 and of which the slit nozzle 35 running parallel to the tenterhook rail track 3 in the heating region is likewise aligned with the film edge 9'.

FIG. 3b reproduces diagrammatically, in an enlarged cross-sectional illustration, a different film thickness profile, above all in the edge region, which, according to FIGS. 3a and 3b, reaches about as far as $F_{RB}$. Here, the distance A from the outermost film edge $F_R$ is reproduced on the X-axis. It is clear from this that the film thickness which is produced, for example, in a final plastic film, and which may move within a $\mu$-range, is thicker by a multiple in the film edge region 9' in and prior to the stretching zone.

FIG. 3a, in this case, reproduces the achievable temperature profile T, also in the film edge region, dots indicating which temperature profile $T_A$ would be achievable if only a hot-air heating device were used, and dashes illustrating which temperature profile TB would be achievable if only an infrared radiator were used.

The unbroken line $T_C$ reproduces the temperature profile actually capable of being set when both an infrared radiator and convection heating, using a hot-air heating device, are employed. In this case, hot air, to which the film edge is subjected, is set at a temperature slightly lower than the actual process temperature. By the process temperature of, for example, 93° C. is meant that temperature at which the plastic film web is to be set overall, particularly during the simultaneous stretching operation. The temperature selected slightly lower for the action of hot air compensates for the infrared irradiation setting, per se, a temperature in the film edge region which is somewhat above the process temperature $T_P$.

At the same time, by slight variations, for example in the temperature of the hot air, and by slight changes in the energy emitted by the infrared radiator, the temperature profile range in the film edge region can be set differently, depending on the desired conditions, for example in such a way that the desired temperature profile $T_C$ in the film edge region moves within the temperature band $\Delta T_{C1}$ or within the temperature range $\Delta T_{C2}$. That is to say, the temperature range $\Delta T$ may be set to rise slightly toward the outermost film edge $F_R$, for example to remain constant horizontally or even to fall slightly. Slight temperature fluctuations within the temperature bands $\Delta T$ drawn in FIG. 3a are insignificant, since these fluctuations are only extremely small and do not have any adverse effects.

The temperature ratios which are set have been simulated and are illustrated with reference to FIGS. 6.1 to 6.4.

Here, the graph according to FIG. 6.1 reproduces the ratios when the film enters the heating zone. If the film has a starting temperature of approximately 80° C., for example before it reaches the heating device, the temperature rises in short time intervals of, for example 0.1 seconds. In other words, the temperature rises to a value of about 95° C. (the temperature values are indicated on the X-axis), this temperature value being set virtually over the entire thickness of the film. In this case, FIG. 6.1 reproduces the film thickness in cross section, the film top side being illustrated at the top with 0.0 $\mu$m and the film underside at the bottom with 0.012 $\mu$m. This film thickness occurs next to the thickened edge region at the transition to the thin film cross section (for example, at the location $F_{RB}$ in FIG. 3b)

FIG. 6.2 reproduces the temperature profile in the thickened film edge (here too, the film top side being illustrated at the top with 0.0 $\mu$m and the film underside at the bottom with 0.25 $\mu$m). A slightly higher temperature is set, here, on the film top side, whereas the temperature is below 93° C. on the film underside.

The ratios according to FIGS. 6.1 and 6.2 occur when, in addition to infrared irradiation, air with a process temperature of, for example, 93° C. is blown onto the film edge.

If, as illustrated in FIGS. 6.3 and 6.4, the film edge is blown at a process temperature of, for example, 90° C., it is shown that the desired process temperature of 93° C. is set virtually constantly, over the entire film thickness, both on the thickened portion of the film edge (FIG. 6.4) and at the region of transition to the thinner film portion in the middle film region.

Corresponding heating devices, known per se, for heating the remaining middle film material portion, in particular using hot air, are not illustrated in any more detail in the figures relating to the exemplary embodiment shown.

The wavelength of the infrared radiator may be selected accordingly within wide ranges. The advantage of short-wave radiators with a wavelength of about 1.1 $\mu$m is that they allow energy to be introduced into deeper film edge layers, since air heats, above all, the surface of the film edge.

By virtue of the concentrated radiation mentioned and the focusing brought about thereby, the edge regions can be irradiated and heated directionally with a predetermined energy cross section. If required, the infrared radiators, may, furthermore, also be cooled by means of integrated water cooling, in order to generate and radiate a high output in a small space (an integrated cooling line in the infrared radiator is designated by 37 in the drawing).

Figures 4, 5:
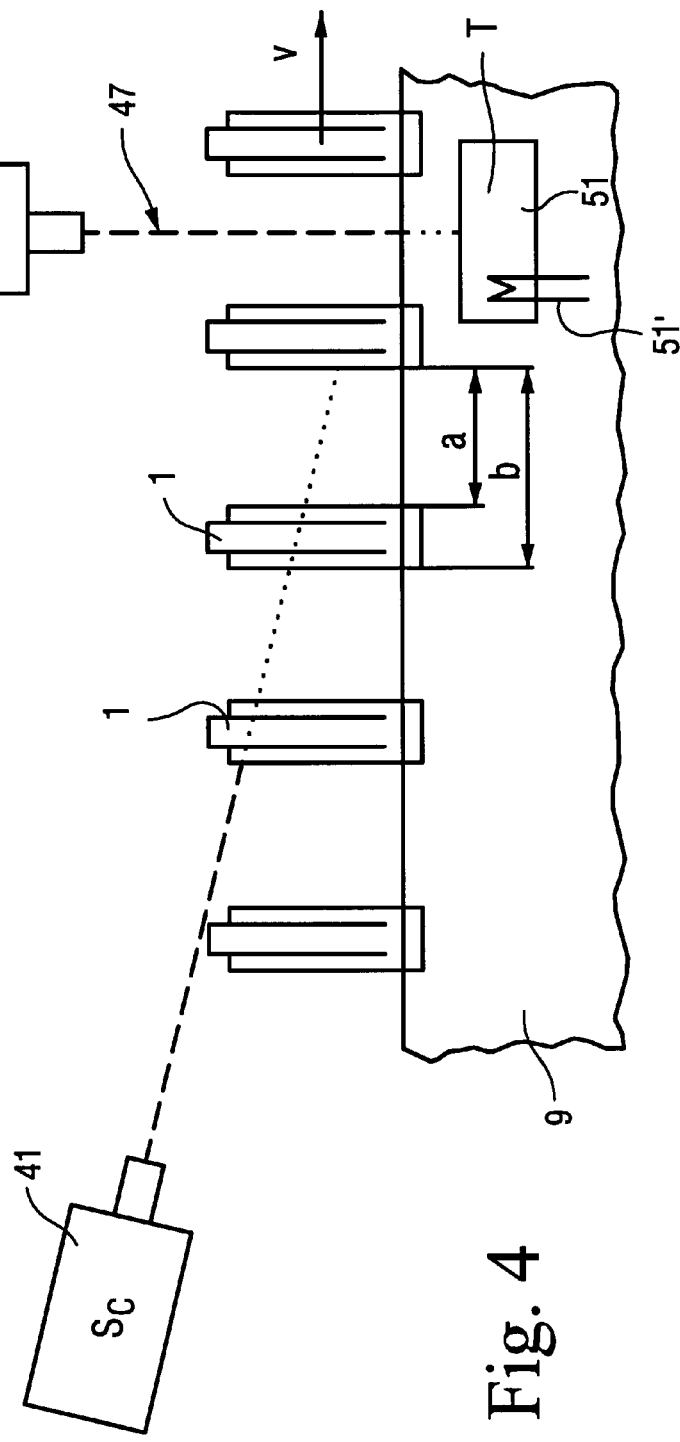
FIG. 4: shows a diagrammatic illustration for measuring the temperature in the film edge region.
FIG. 5: shows a diagrammatic optical reproduction for determining the film temperature in the edge region.

Reference is made below to FIGS. 4 and 5, by means of which a temperature measuring device is explained, in order, on the basis of the film edge temperature determined, to activate and operate directionally the film edge heating devices explained above.

In order to set and control the desired optimized temperature profile even in the edge region, it is necessary to measure the edge temperature of the film. However, the film edges are held at particular intervals by the tenterhooks mentioned, depending on the stretching ratio, the temperature between these tenterhooks being relevant to the process of simultaneous stretching, although the tenterhook temperature itself may cause the measurement result to be falsified.

Since accurate measurement of the temperature of the film edge while the plant is in operation, that is to say during the permanent rotation of the tenterhooks, is therefore not directly possible, contactless measurement by means of pyrometers is proposed. In this case, however, contactless measurement by means of a pyrometer does not yet give the desired sensing rate with the necessary narrow band width of the detector or does not supply the desired accuracy because the temperature is recorded too slowly. Only a falsified mixed signal is therefore ultimately measured, which includes the temperature of the tenterhooks 1 moving past and the temperature of the film edge 9' in the interval a (FIG. 4) remaining between two adjacent tenterhooks 1.

Film edge temperature measurement and a film edge temperature measuring arrangement, using at least two pyrometer arrangements 41, 43, are therefore proposed.

By means of a first pyrometer arrangement 41, only the tenterhook temperature is measured by means of a wide-band slow pyrometer (that is to say with a long response time), in such a way that at least one tenterhook 1 is continually detected. According to the diagrammatic illustration shown in FIG. 4, this can be ensured by orienting the detection direction 45 of the first pyrometer arrangement 41 with a tangential component to the film edge 9' and, consequently, to the respective rail portion 3, on which the tenterhooks 1 are moved along.

Via the second pyrometer arrangement 43, a mixed temperature is measured by means of a narrow-band pyrometer which is designed for the respective type of film and has a long response time and the setting time of which is such that the interchange between tenterhooks 1 moving past and the film 9 or film edge 9' does not lead to signal fluctuation. In the exemplary embodiment shown, the second pyrometer arrangement 43 is oriented at right angles to the film edge 9', that is to say, as a rule, essentially transversely or at right angles to the film web plane, the detection direction 47 being aligned with the film edge 9' moved past in each case, and the tenterhooks 1 also being moved through here in the induction region.

A signal $S_C$ for the tenterhook temperature (measured by the first pyrometer arrangement 41) and a mixed signal $S_{F+C}$ for the mixed temperature consisting of the film temperature and of the tenterhook temperature are reproduced diagrammatically in FIG. 5.

By means of an electronic central control and evaluation device, not illustrated in any more detail, particularly using a microprocessor circuit arrangement, the actual film temperature $S_F$ can be determined continuously and contactlessly during production, as illustrated graphically in FIG. 5 (the film edge temperature always falling to the tenterhook temperature in the region of the tenterhook and rising rapidly to the actual film temperature $S_F$ again in between). In FIG. 5, the signal magnitudes S determined are plotted against the time axis t and the formulas for the dependence of the film temperature $T_F$ are reproduced.

In this case, furthermore, the actual film temperature or film edge temperature can be determined in the evaluation and control system, taking into account the current geometric ratios (tenterhook size, tenterhook interval a, tenterhook sequence b, etc.) and a correcting factor, and can be converted to the temperature of the edge strip.

Finally, calibration of the pyrometers 41, 43 is also possible. When the simultaneous stretching plant is running without film, a calibrating plate 51, illustrated in FIG. 4, having an automatic calibrating sequence can be heated, a measuring sensor 51' being integrated in the plate and the measured temperature being monitored. In this case, the calibrating plate 51 is located in the detector range 47 of the second pyrometer arrangement 43. At the same time, the temperature measured by the pyrometer 43 is compared with the temperature measured by the measuring sensor 51' assigned to the calibrating plate 51, and a correcting factor correspondingly included later in the evaluation is determined.

Via the edge strip temperature measurement calibrated in this way, the infrared radiators and/or the hot-air heating device can then be controlled.

The accuracy of the measurement may be increased by providing a defined background in the form of a black radiator which, during measurement, leads to a defined background with a constant temperature, that is to say defines the transmitted background radiation, and, on the other hand, can be utilized for calibrating the system during idling phases of the machine (black plates).

The combination of the directional influence exerted via radiation and hot air with the edge strip temperature measurement may be utilized as a closed control loop for an exact setting of the edge strip temperature.

The edge strip heating explained for simultaneous stretching plants can be installed, and used, on different sections of the plant, thus, for example, in the infeed zone 4, in the preheating zone 5, in the simultaneous stretching zone 7, but also in the restretching zone 8, as illustrated diagrammatically in FIG. 1 by the reference symbol 6.

The exemplary embodiments have been explained in terms of a situation where infrared irradiation and hot-air action are in each case carried out simultaneously. That is to say insofar as a double heating device, specifically an infrared radiator and a hot-air heating device or hot-air discharge nozzles, is provided in each case on corresponding heating sections 6. It is perfectly possible, however, to envisage instances of use, in which the heating of the film edge by means of infrared radiators or by means of hot air does not always or exclusively have to take place simultaneously, that is to say simultaneously with respect to a specific portion of the film edge. Moreover, there may, instead, be provision, during the forward movement of the film web to be treated, for providing, on the plant, additional plant sections, in which only infrared heating or only hot-air action is additionally carried out. It may therefore also be envisaged that the double heating explained takes place in an at least partially staggered manner in the longitudinal direction of the plant, so that the plant zone for infrared heating and the plant zone for hot-air action overlap only in portions, so that, in these overlapping portions, said infrared irradiation and hot-air action take place simultaneously and, in the portions which do not overlap, only infrared irradiation or only hot-air action takes place.

Even though, with regard to the hot-air heating device, the exemplary embodiment has been explained in terms of the situation where heated air is supplied to the film web or the film edge, the expression "air" refers to any suitable gas mixture which may be used for this purpose.

What is claimed is:

1. A method of heating and maintaining thermal control of a plastic film in a stretching process, wherein the plastic film is a web having a main central portion and two parallel edges, the method comprising:
    (a) heating the entire plastic film web as a whole with heated air, infrared irradiation or both, and
    (b) heating and thermally controlling the film edges by applying in combination hot air and infrared irradiation in a controlled manner thereby setting or activating the film edges and thereby reducing a temperature deviation of the film edges from a desired process temperature.

2. The method of claim 1, wherein in step (b) the hot air is applied to the film edges at a temperature below a desired process temperature or a desired film temperature.

3. The method of claim 1, wherein the infrared irradiation applied is focused on the film edge.

4. The method of claim 1, wherein the infrared irradiation and hot air are applied and controlled in accordance with the temperature of the film edge.

5. The method of claim 4, wherein the film edge temperature is determined by indirect measurement from a plurality of locations on the film edge and the measured temperature values are compared.

6. The method of claim 1, including the additional step of:
    (c) providing additional heat to the entire film web as a whole by applying hot air, infrared irradiation or both.

7. Apparatus for the heating or thermal control of a plastic film having a central portion and two parallel edges in a plastic film stretching processes, said apparatus comprising:
    a hot-air heating device for subjecting the plastic film to hot air, or an infrared radiator device for irradiating the plastic film by means of IR rays or both hot air and IR rays,
    a separate device for heating the film edge which comprises in combination an infrared radiator device and a hot-air heating device, wherein the infrared radiator device and the hot-air heating device can be activated or set to independent heating temperatures.

8. The apparatus according to claim 7, wherein the infrared radiator device includes a focusing device in the form of a hollow reflector or parabolic mirror.

9. The apparatus according to claim 8, wherein the infrared radiator is provided with an integrated cooling device.

10. The apparatus according to claim 7, wherein the plastic film is supported and transferred on a series of levered tenterhooks during heating and stretching operations.

11. The apparatus according to claim 10, wherein a plurality of infrared radiator devices are arranged in such a way that the tenterhooks are moved essentially below said radiator devices.

12. The apparatus according to claim 11, wherein the infrared radiator devices are arranged essentially parallel to the tenterhooks and above the film edge as well as above an upper limit of a region covered by the tenterhook levers.

13. The apparatus according to claim 7, wherein the hot-air heating device is provided, in heating zones, with a nozzle aligned essentially parallel to and in advance of the film edge which is aligned essentially with the film edge.

14. The apparatus according to claim 13, wherein a hot-air duct of the hot-air heating device reaches over the infrared radiator device such that an outlet nozzle of the hot-air heating device is offset in the direction of the center of the plastic film with respect to the infrared radiation region.

15. The apparatus according to claim 7, wherein the infrared radiator devices radiate at a wavelength of 0.1 to 10 $\mu$m.

16. The apparatus according to claim 7, wherein, in addition to the simultaneous heating of the film edge by means of infrared radiators and hot-air heating devices, an additional infrared radiator device or hot-air heating device is provided for the central portion of the film.

17. The apparatus according to claim 10, further including a measuring device for measuring the film edge temperature comprising a plurality of pyrometers aligned essentially with the film edge, and that the film edge temperature is determined, via said pyrometers, taking into account a mixed temperature which is obtained from the measurement, occurring during the measuring cycle, including the tenterhook temperature and the film edge temperature in the space between two adjacent tenterhooks.

18. The apparatus according to claim 17, wherein the pyrometers are arranged such that the space between tenterhooks moving past and the film edge is detectable between two tenterhooks, can be carried out without any signal fluctuation or essentially without any signal fluctuation.

19. The apparatus according to claim 17, wherein at least one further pyrometer arrangement is provided which measures only the tenterhook temperature.

20. The apparatus according to claim 19, wherein the pyrometer arrangement for measuring the tenterhook temperature is oriented with a tangential component to the film edge such that, in each case, at least one tenterhook is located in the detection range of said pyrometer arrangement and the film or the film edge is essentially or completely shielded.

21. The apparatus according to claim 17 wherein the film temperature ($S_F$), at which the film edge heating device is activated is determined by means of an electronic evaluation and/or control device from a measured signal for the tenterhook temperature and a mixed signal for the mixed temperature.

* * * * *